Dec. 31, 1929.  S. SCHOOR  1,741,344
RESILIENT WHEEL
Filed Aug. 22, 1928
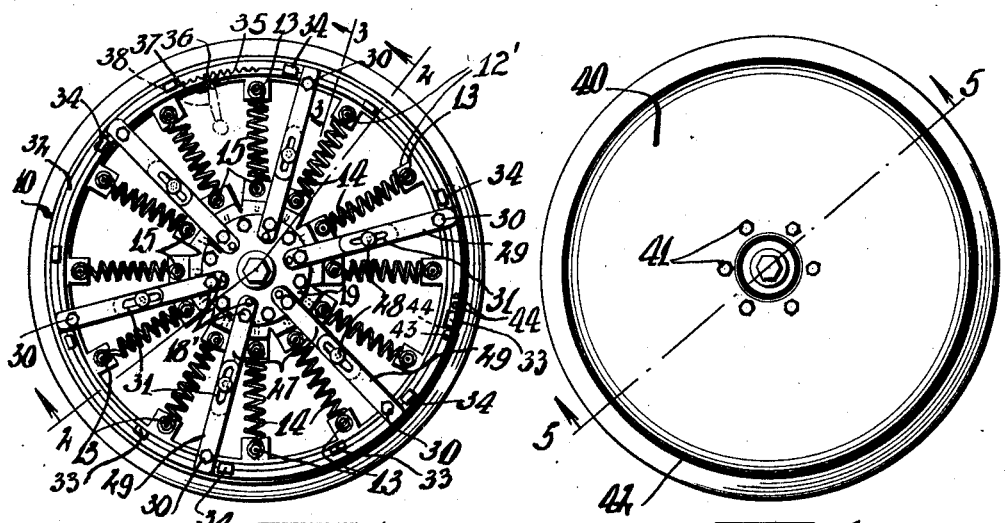
INVENTOR.
Samuel Schoor
BY
ATTORNEY Patented Dec. 31, 1929

1,741,344

UNITED STATES PATENT OFFICE

SAMUEL SCHOOR, OF NEWARK, NEW JERSEY

RESILIENT WHEEL

Application filed August 22, 1928. Serial No. 301,284.

This invention relates to a new and useful device in the nature of a spring wheel for vehicles. The object of the invention is to provide resiliency without the use of the usual pneumatic tire which is expensive and troublesome.

Another object of the invention is to provide a spring wheel providing cushioning qualities when starting the motor vehicle on rough or uneven roads and when running over snow or ice under difficult traction.

A further object of the invention is to provide a spring wheel of novel construction and arrangement of parts hereinafter more fully described, claimed and illustrated in the accompanying drawing.

Fig. 1 is a front elevational view of my improved spring wheel as same would appear when attached to the front axle of a vehicle.

Fig. 2 is a transverse sectional view taken on the line 2—2 of Fig. 1.

Fig. 3 is an enlarged fragmentary sectional view taken on the line 3—3 of Fig. 1.

Fig. 4 is a front elevational view showing my improved spring wheel in the form of a disc wheel.

Fig. 5 is a transverse central sectional view on line 5—5 of Fig. 4.

As here embodied my improved spring wheel comprises an outer rim 10 of the usual well known construction upon which is mounted the solid rubber tire 11 such as commonly used for vehicles. The outer rim 10 is attached, preferably shrunk on the felloe band 12, which is of band or ring-like construction. A plurality of bolt and nut members 13 are secured to the inner edge of the felloe band and extend inwardly therefrom, and are preferably evenly spaced on the felloe band.

Expansion springs 14 are secured at one extremity to lugs 12' projecting from the band 12 by bolt and nut members 13 and extend radially inwardly from the felloe band and are secured to other lugs 16' projecting from a support 16 by bolt and nut members 15. The support 16 is of band or ring-like construction and is adapted to engage over the hub 17 and is secured thereto by threaded members 18 mounted in the flanged element 19 of the hub 17 and the hub flange 20.

The hub 17 is rotatively mounted on the ball bearings 21 and 22 carried on the front axle spindle 23. While in the accompanying drawing I have shown a front axle of the usual type, it is understood that my improved spring wheel may be attached to the rear axle of the motor vehicle.

It is obvious that the above described construction is such as will provide a resilient spring wheel due to the action of the springs 14.

A plurality of supports 27 are rigidly secured to the hub 19 and extend radially therefrom and have formed therein, in proximity to their extended extremities apertures adapted to receive the pins 28. A plurality of links 29 are pivotally mounted at one extremity as at 30 on bolts or the like carried in the felloe band 12 and extend radially inwardly therefrom, and have formed therein, in proximity to their free extremities elongated slots 31 adapted to freely receive the above mentioned pins 28.

The hub 17 is provided with the usual hub cap 26 threadedly attached thereto.

A band member 32 of ring-like construction is adapted to slidably engage under the clip members 33 which are secured to the felloe band 12 and extend therefrom having formed therein openings adapted to receive the said band member. This band member 32 also slidably engages under the extremities of the links 29 in proximity to the pivot points 30. The band member is provided with raised or projected elements 34 located in proximity to the links 29. Suitable gear teeth 35 are formed at one section on the band member and engage with a pinion 36 secured to the pin 37 rotatively carried in the felloe band. A crank handle 38 is adapted to removably engage the pin 37 as a means of rotating the said pinion 36 so as to partially rotate the band member.

The above described construction is such as will permit the projected elements 34 of the said band member to be positioned in any desired position relative to the links 29 so as to limit the pivoting action of the said links or such as will nullify the action or movement of the said links. It is obvious that the latter described construction is such as will allow a desired amount of free movement of the tire, so as to avoid wear and tear when starting on rough roads or on snow or ice.

A limiting pin 43 slidably engages in one of a plurality of apertures 44 formed in the band member and in an aperture formed in the felloe band as a means of maintaining the adjusted position of the band member.

In Figs. 4 and 5, of the accompanying drawing, I have shown a disc 40 secured in the usual manner by threaded members 41 to the above mentioned hub 17. The disc 40 is flanged outwardly as at 42, at its outer edge or periphery so as to clear the rim 10 and tire 11 mounted thereon.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to protect by Letters Patent of the United States is as follows:—

1. In a resilient wheel, a link pivotally mounted at its outer end on a felloe band, a band mounted on the felloe band and passing beneath the outer extremity of said link, and a raised element projecting from the second band and located in proximity of said link for limiting the pivoting distance of the link.

2. In a resilient wheel, a link pivotally mounted at its outer end on a felloe band, a band movably mounted on the felloe band, and passing beneath the outer extremity of the said link, a raised element projecting from the second band, located in proximity of the link, and means for moving the second band for changing the position of the said raised element to the link for changing the pivoting distance of the link.

In testimony whereof I have affixed my signature.

SAMUEL SCHOOR.